United States Patent [19]

Cole

[11] 4,206,595
[45] Jun. 10, 1980

[54] FUEL COLLECTING AND RECYCLING SYSTEM

[75] Inventor: Edward F. Cole, Glastonbury, Conn.

[73] Assignee: United Technologies Corporation, Hartford, Conn.

[21] Appl. No.: 898,608

[22] Filed: Apr. 21, 1978

[51] Int. Cl.² .............................................. F02C 3/24
[52] U.S. Cl. ................................................ 60/39.09 F
[58] Field of Search ............... 60/39.09 F; 244/135 R; 431/29, 30; 417/199 A, 425, 435

[56] References Cited

U.S. PATENT DOCUMENTS

| | | | |
|---|---|---|---|
| 2,551,241 | 5/1951 | Buckland | 60/39.09 F |
| 3,103,229 | 9/1963 | Smith | 60/39.09 F |
| 3,841,089 | 10/1974 | Clark | 60/39.09 F |
| 3,901,025 | 8/1975 | Bryerton et al. | 60/39.09 F |

FOREIGN PATENT DOCUMENTS

| | | | |
|---|---|---|---|
| 69045 | of 1914 | Switzerland | 417/199 A |
| 664245 | 1/1952 | United Kingdom | 60/39.09 F |

Primary Examiner—Carlton R. Croyle
Assistant Examiner—Edward Look
Attorney, Agent, or Firm—Norman Friedland

[57] ABSTRACT

This system serves to collect and recycle fuel leftover in the fuel manifold and fuel distribution system of a gas turbine power plant when it is shutdown and operates in conjunction with the power plant's existing fuel control.

5 Claims, 1 Drawing Figure

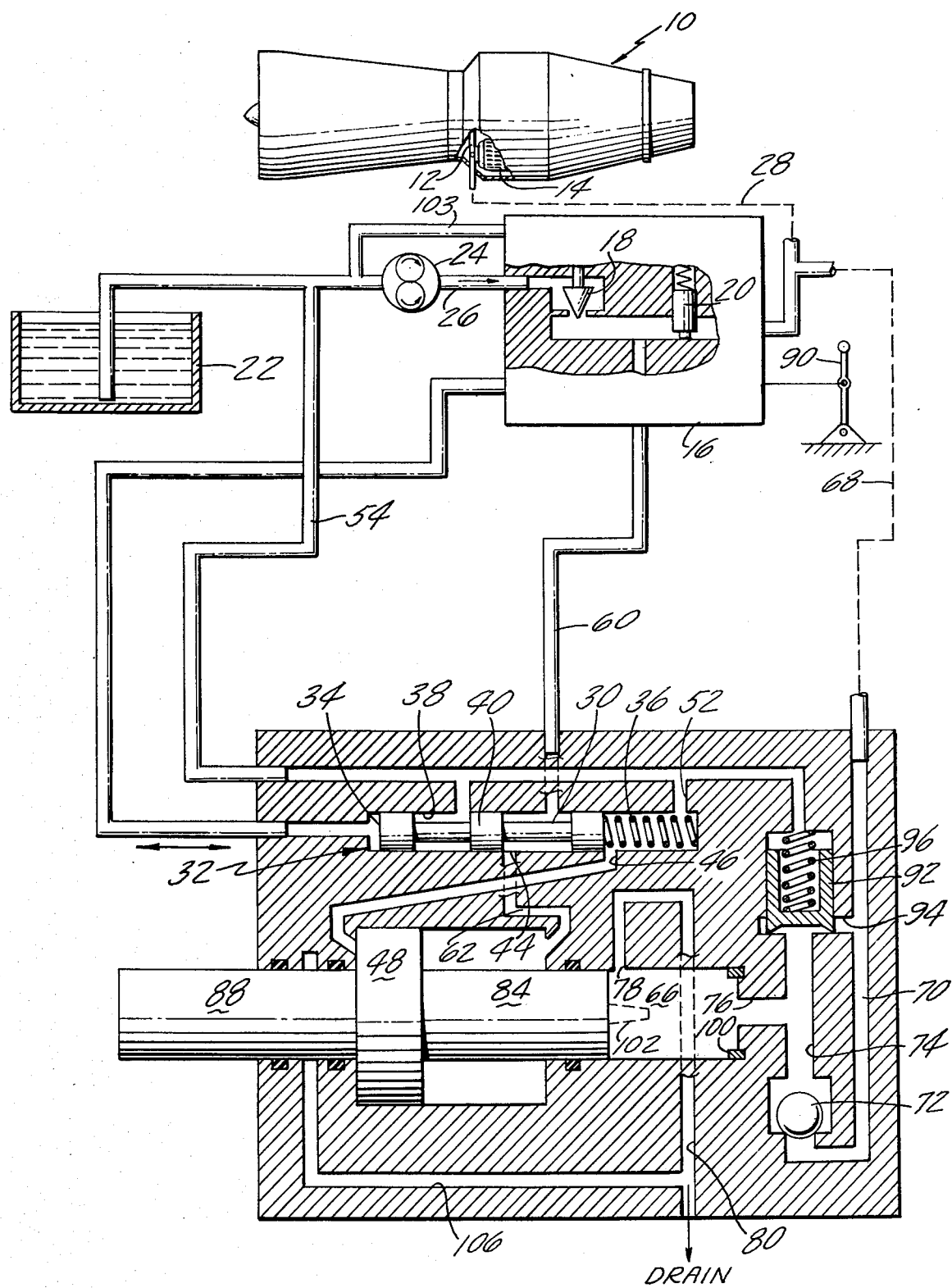

FUEL COLLECTING AND RECYCLING SYSTEM

BACKGROUND OF THE INVENTION

This invention relates to the fuel system of a gas turbine engine and particularly to means for collecting and recycling fuel leftover in the fuel manifold and distribution system upon engine shutdown.

Upon engine shutdown a certain amount of fuel remains in the fuel distribution system that must be removed to prevent puddling, gumming and coking. Heretofore, these lines containing the leftover fuel were emptied by venting them to atmosphere. The practice of dumping fuel directly into the atmosphere is now unacceptable and industry has directed its efforts in solving this problem. A method for removing and recycling this leftover fuel is disclosed in U.S. Patent Application Ser. No. 751,803 filed on Dec. 16, 1976 by J. A. Gavin and C. A. Senatro and assigned to the same assignee as the patent application.

This invention contemplates integrating a fuel drain and refill unit with the fuel control so as to achieve not only a means of recycling the fuel, but to reintroduce the fuel at a controlled rate during engine start-up.

SUMMARY OF THE INVENTION

The improved feature of this invention is a means for recycling fuel collected from the fuel distribution system of a gas turbine engine powered aircraft at a controlled rate.

BRIEF DESCRIPTION OF THE DRAWING

The sole FIGURE is a view partly in section and partly in schematic illustrating the invention.

DESCRIPTION OF THE PREFERRED EMBODIMENT

In the context of this application, the distribution system includes without limitation the common manifold supplying fuel to several fuel nozzles or a flow divider valve supplying the several nozzles through two or more pipes. It should be appreciated that the pump and control are conventionally on gas turbine engines and the minimum pressure and shutoff valve functions are incorporated in existing fuel controls and these functions may be individual or combined. As for more details of controls and minimum pressure and shutoff valves reference should be made to the fuel control models, like the JFC-25, JFC-60, etc. manufactured by the Hamilton Standard Division of United Technologies Corporation.

As can be seen in the sole FIGURE of the drawing the gas turbine engine is generally indicated by reference numeral 10 which may include any type as for the JT-3, JT-8 and JT-9 manufactured by the Pratt & Whitney Aircraft division of United Technologies Corporation and for more details reference should be made thereto. For the purpose of this invention it is merely necessary to appreciate fuel metered to the engine is through the fuel manifold 12 that feeds a plurality of burners (one being shown) or an annular burner (not shown) through the fuel nozzles (not shown). Box 16 represents a typical fuel control that amongst its many components includes a throttle valve 18 and a minimum pressure and shutoff valve 20 (MP+SOV). Hence, for the sake of convenience and simplicity suffice it to say that the fuel from the reservoir 22 is pressurized by pump 24 and fed to the fuel control 16 via line 26. The metered fuel is supplied to the fuel manifold via line 28 connected to the fuel passages in the fuel control 16. As is conventionally provided pump flow in excess of metered flow is bypassed to pump inlet via line 103. The MP+SOV 20 assures that fuel is admitted to the engine only when it reaches a minimum predetermined pressure, which minimum pressure is necessary so as to reach the operating pressure of the control servoes whereby the fuel control is able to function properly before delivering fuel to the engine.

In order to fully appreciate this invention it may be best to describe the details of the component parts in connection with the operation modes of the engine and the functions each of the components provide. In this light the description hereinbelow will describe the shutdown, start-up and running mode of the engine.

Operation during shutdown is as follows:

Positioning the condition or power lever 90 to the shutoff position causes the pressure behind the MP+SOV 20 to be vented to pump outlet pressure, which causes the valve to close owing to the compression force of the spring and the pressure behind the valve. This blocks off the flow of fuel to the engine. Simultaneously, the control signal emanating from the fuel control 16 which may be one of any number of control functions, such as pressure, power lever position and the like reduces from a high pressure value to a low pressure value. This signal acting on one end 34 of spool 30 of the four-way spool valve 32, allows the spring 36 to position spool 30 to the left end of bore 38. Lands 40 and 42 move to the left of ports 44 and 46 respectively, interconnecting the left end of power piston 48 with pump inlet pressure via line 50, bore 38, branch line 52 and line 54 while simultaneously connecting the right side of power piston 48 with pressurized fuel downstream of throttle valve 18 via line 60, bore 38, port 44 and passage 62. Inasmuch as pressure in line 60 is higher than the pressure in line 54 (or essentially pump outlet and pump inlet pressures respectively) the power piston 48 will be positioned to the left as shown in the drawing.

As the power piston 48 moves leftwardly the volume of scavenge cylinder 66 increases thereby collecting the fuel in the fuel distribution system. Hence, fuel in the nozzles and manifold 12 will drain via line 28, line 68, passage 70, check valve 72, passages 74 and 76, into scavenge cylinder 66.

Port 78 located at the upper lefthand corner of cylinder 66 communicates with drain via line 80 and serves to vent any air that may have been captured in the fuel which could occur if one line emptied faster than another. It is important to note that port 78 is at the edge of plunger 84 when power piston 48 is at the end of its travel so that plunger 84 will immediately close it off when it starts to return the fuel back into the distribution system.

The volume of cylinder 66 is sized to accommodate all the fuel removed from the fuel distribution system during engine shutdown.

The diameter of compensating plunger 88 is sized the same as the diameter of plunger 84, so that power piston 48 has the same operating area on both of its sides and hence allows power piston to move in either direction without changing the total volume of fuel within the fuel control 16 and pump 24.

It is apprent from the foregoing that the volume of cylinder 66 is sized to hold all the fuel remaining in the distribution system and is actuated to its scavenging position during the engine shutdown.

Operation during start-up is as follows:

Positioning the condition or power lever 90 to the run position causes the volume behind the MP+SOV 20 to be vented to pump inlet pressure. This allows the shutoff valve to open whenever the pressure downstream of the throttle valve 18 is sufficient to overcome the spring force. Upon reaching the predetermined pressure value valve 20 opens and communicates with the fuel distribution system which occurs solely after the collected fuel is recycled as will be described hereinbelow.

Simultaneously, with power lever positions the control signal emanating from the fuel control increases and positions spool valve 30 rightwardly. Lands 40 and 46, obviously shift to the opposite sides of ports 44 and 46 reversing the connection of the power piston 48. Namely, pressure downstream of throttle valve 18 is ported to the left end of piston 48 and the right end of the piston 48 is vented to pump inlet forcing the plunger 84 rightwardly. This causes the fuel in the cylinder 66 to return to the fuel distribution system via passages 76, 74 back pressure valve 92, branch passage 94, passage 70 and line 68. The spring force of spring 96 is selected so that valve 92 opens at a lower pressure than valve 20. Although not shown, the back side of valve 20 is referenced to the same pressure as the back side of valve 92. Inasmuch as the flow from throttle valve 18 will take the path of least resistance it will first flow through line 60, through spool valve 30 to the left side of piston 48, causing the piston 48 to move at a rate that is proportional to the flow rate and the actuating area of piston 48.

Initial movement of piston 48 causes plunger 84 to block-off port 78 and hence prevent fuel from escaping through the air vent. As the volume of cylinder 66 decreases the fuel therein is forced to flow to the distribution system at a rate similarly proportional to the fuel being metered by the throttle valve 18. It should be noted that the discharge rate from cylinder 66 can be increased or decreased by relative sizing of the areas of power piston 48 and plunger 84. When plunger 84 reaches the end of its travel and abuts against seal 100, metered fuel to piston 48 is dead ended causing back pressure to increase at which time the valve 20 now is capable of opening and allowing the metered fuel to pass to the fuel distribution system in the normal manner.

The axial jutting member or pintle 102 shown in phantom and designed to fit its passage 76 may be employed if at the moment the plunger 84 completes its stroke the valve 20 is not opened instantaneously, resulting in a momentary flow interruption or undesirable pressure spike. The pintle 102 serves to gradually increase the back pressure prior to the plunger 84 approaching the end of its travel. Obviously this would provide an overlap between the opening of valve 20 and closing of valve 92.

Operation while the engine is running is as follows:

The plunger 84 remains in the deployed position until the power lever calls for a shutdown or the flow of fuel is stopped. During this interim the end of plunger 84 bears against seal 100 which also serves as the stop. Any leakage past this seal 100 will migrate overboard via line 80 or line 106.

It should be understood that the invention is not limited to the particular embodiments shown and described herein, but that various changes and modifications may be made without departing from the spirit or scope of this novel concept as defined by the following claims.

I claim:

1. Means for recycling fuel leftover in the connecting lines of a fuel supply system for a gas turbine engine in combination with a fuel control having a minimum pressure and shutoff valve opening when the pressure of the fuel being metered achieves a given value, said recycling means having fuel collecting means collecting the fuel captured in said connecting lines upon engine shutdown and including a shutoff valve interconnecting the fuel collecting means and said fuel supply system, the volume of said collecting means bearing a given relationship to the volume of said connecting lines so as to collect all of the fuel remaining in said connecting lines, said minimum pressure and shutoff valve and said shutoff valve being referenced to the same pressure signal for setting a first value of the opening force on each of said valves, additional force means subjecting each of said valves to a second value so that the total of said first and second values constitutes the force required to open each of said valves, the force of said additional force means on said shutoff valve being less than the force of said additional force on said minimum pressure and shutoff valve whereby said shutoff valve opens prior to said minimum pressure and shutoff valve thereby assuring a smooth transition of fuel being admitted to said engine upon engine start up.

2. Means as in claim 1 wherein said collecting means includes an expansion chamber and a retractable plunger, a power piston connected to said retractable plunger and fluid connections for admitting metered fuel from said fuel control to impart rectilinear movement to said plunger for filling and emptying said expansion chamber with recycled fuel.

3. Means as in claim 2 including valve means having porting means interconnecting said fuel control and said fluid connection directing the metered fuel to said power piston and means for actuating said fuel control and said valve means synchronously so that the recycled fuel and metered fuel are sequenced to the engine upon engine start-up.

4. Means as in claim 3 wherein said valve means is a four-way spool valve.

5. Means as in claim 3 wherein said actuating means is the power lever of said fuel control.

* * * * *